United States Patent [19]

Fischer, deceased et al.

[11] 4,325,443
[45] Apr. 20, 1982

[54] TURNING ASSISTANCE FOR TRACKED VEHICLES

[76] Inventors: Frederick C. Fischer, deceased, late of Rochester, Mich.; by Carole M. Fischer, heir, 72 Wimberly Dr., Rochester, Mich. 48063

[21] Appl. No.: 45,023

[22] Filed: Jun. 4, 1979

[51] Int. Cl.³ ................. B62D 11/02; B62D 55/16
[52] U.S. Cl. .................... 180/6.54; 180/9.44; 180/22; 305/27
[58] Field of Search .......... 180/6.54, 22, 9.44, 180/9.5, 8 A; 305/27

[56] References Cited

U.S. PATENT DOCUMENTS

| | | | |
|---|---|---|---|
| 2,044,307 | 6/1936 | Kégresse | 180/6.54 |
| 2,860,715 | 11/1958 | Bouffort | 305/27 |
| 3,246,405 | 4/1966 | Reynolds | 305/27 |
| 3,374,005 | 3/1968 | Donlon et al. | 305/27 |
| 3,409,100 | 11/1968 | Kronqvist | 180/6.54 |
| 3,409,309 | 11/1968 | Larsen | 305/27 |

Primary Examiner—John J. Love
Assistant Examiner—Donn McGiehan
Attorney, Agent, or Firm—Peter A. Taucher; John E. McRae; Nathan Edelberg

[57] ABSTRACT

A tracked vehicle having power mechanism for temporarily increasing the suspension force on the centermost roadwheels and decreasing the suspension force on the endmost roadwheels during a vehicle turning action. The temporary change in distribution of the suspension force tends to reduce skidding forces that impede vehicle turn action.

2 Claims, 3 Drawing Figures

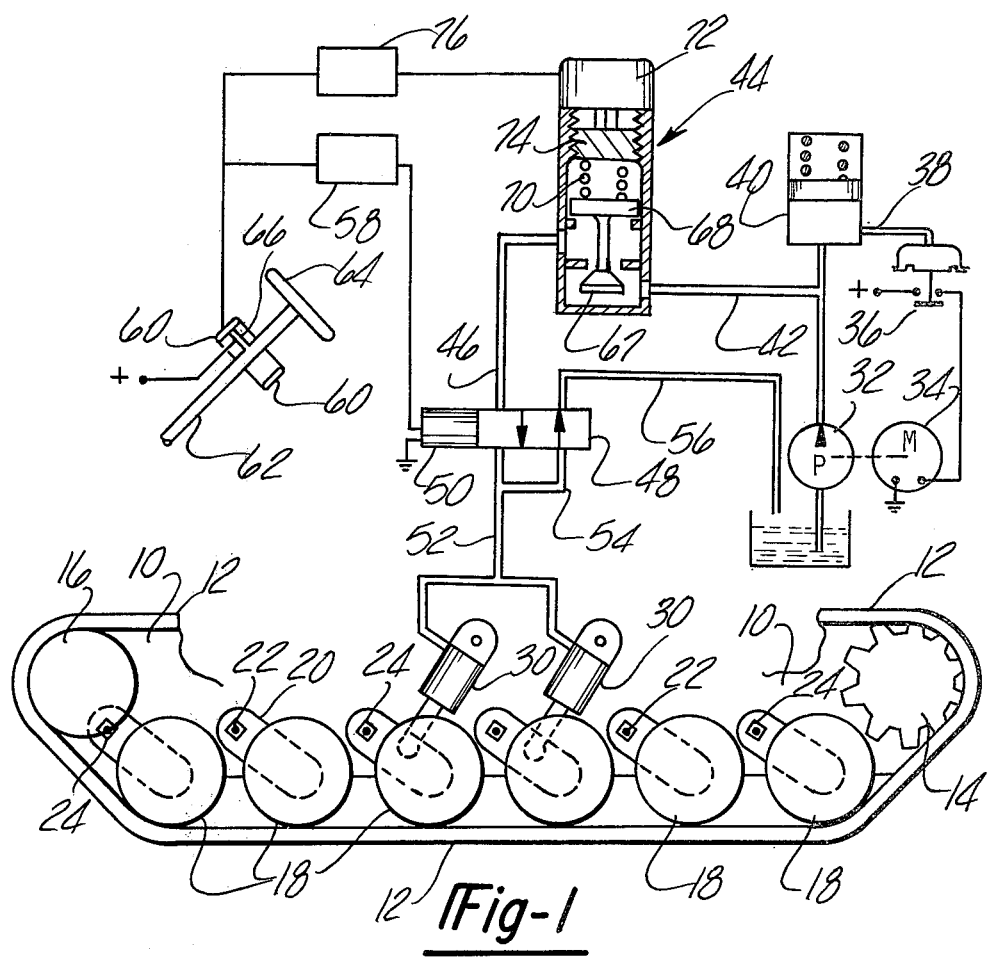
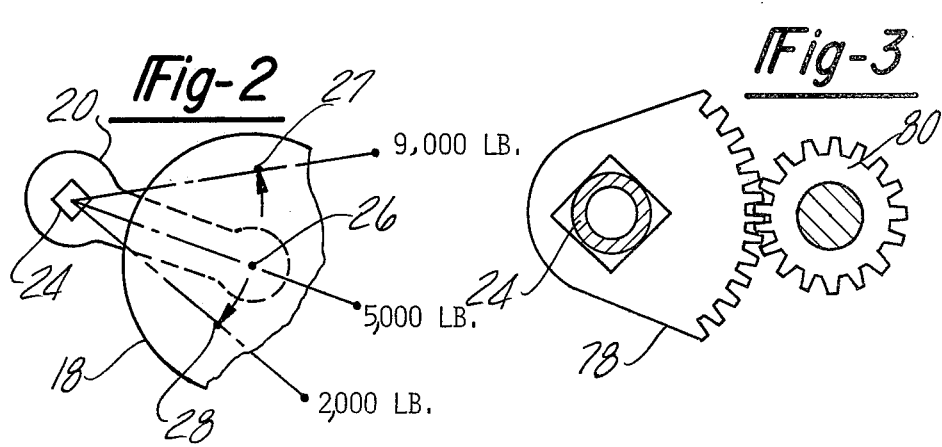

TURNING ASSISTANCE FOR TRACKED VEHICLES

The invention described herein may be manufactured, used, and licensed by or for the Government for governmental purposes without payment to me of any royalty thereon.

BACKGROUND AND SUMMARY OF THE INVENTION

High speed tracked vehicles are often designed with large numbers of roadwheels to maximize the wheel base and reduce the amplitude of undesired pitching. However, the relatively long wheel base conflicts with easy turning action achieved by a shorter wheel base. The present invention is directed to an auxiliary power mechanism which automatically reduces the length of track subjected to high ground pressures during vehicle turning maneuvers; the reduced effective track length enables the vehicle to undergo a desired turn action with minimum power expenditure and lessened wear on the track components. This increased agility of the vehicle will be achieved without sacrifice in rideability or vehicle speed under normal straight-ahead operations.

IN THE DRAWINGS

FIG. 1 schematically illustrates a tracked vehicle using the present invention.

FIG. 2 shows representative suspension forces associated with a roadwheel during its normal stroke between the rebound and jounce positions.

FIG. 3 fragmentarily illustrates a torsion bar adjustment mechanism that can be used as a substitute for a hydraulic force means in the FIG. 1 vehicle.

FIG. 1 is a partial side elevational view of a conventional military tank comprising a hull 10, an endless ground-engaged track 12, rear track-driving sprocket wheel 14, forward idler wheel 16 and six roadwheels 18. It will be understood that the wheel-track assembly is duplicated at the non-illustrated side of the vehicle. Powered motion of sprocket wheels 14 produces orbital motion of the tracks, hence forward (or reverse) motion of the hull. When one of the sprocket wheels 14 is operated at a reduced speed, or held motionless, or reversed in direction relative to the other sprocket wheel, then the vehicle exerts a turning maneuver.

Each roadwheel 18 is carried on a roadarm 20 that is swingably attached to hull 10 for oscillating movement around a pivot axis 22. In this particular vehicle the individual roadarms exert suspension forces on the hull by means of individual torsion bars 24 extending laterally through the hull interior to fixed anchorages adjacent the opposite wall of the hull. Pre-twist windup forces applied by the anchorages to the torsion bars provide the suspension force. In a typical vehicle the suspension force at each roadwheel can be on the order of 5000 pounds when the roadwheel is in its so-called normal at-rest position, designated by numeral 26 in FIG. 2. When a terrain disturbance causes the roadwheel to oscillate upwardly to the jounce position, designated by numeral 27 in FIG. 2, the suspension force will increase to a higher value, e.g. 9000 pounds. In the rebound position, designated by numeral 28 in FIG. 2, the individual suspension force produced by the roadwheel will be relatively low, e.g. 2000 pounds.

The present invention concerns an auxiliary power mechanism for increasing the suspension force on the two centermost roadwheels while the driver of the vehicle is rotating the steering wheel, i.e. during a vehicle turning maneuver. The increased suspension force at the centermost roadwheels automatically reduces the forces at the endmost roadwheels, thereby reducing the road-track frictional forces at the endmost wheels; the result is a quicker vehicle turn with lesser energy expenditure by the propulsion system.

In a representative system, if we assume a normal load on each roadwheel of 5000 pounds we have a total suspension force of 30,000 pounds (for each side of the vehicle); by temporarily increasing the load on each of the centermost roadwheels to 9000 pounds we can cause those wheels to carry 18,000 pounds, leaving only 12,000 pounds to be carried by the four remaining roadwheels. If the 12,000 pound load is evenly distributed on the four roadwheels (the two front wheels and the two rear wheels) then each of these four wheels carries only 3000 pounds, rather than the original 5000 pounds. In this way it is possible to lessen the power expenditure needed to produce a vehicle turning maneuver.

The mechanism for temporarily increasing the suspension force on the centermost roadwheels can include two single-acting hydraulic cylinders 30 attached between hull 10 and the respective roadarm 20. Each cylinder is supplied with hydraulic fluid from a pressurized source that includes a pump 32 operated by an electric motor 34. The motor is controlled by a pressure switch 36 that includes a pressure-sensor conduit 38 communicating with an accumulator 40. In operation of this system, when the accumulator pressure drops below the pressure setting of switch 36 the switch contacts close to energize motor 34. Pump 32 is then operated to raise the accumulator pressure above the setting of switch 36, whereupon the switch contacts open to de-energize motor 34.

Pressurized fluid in line 42 is directed through a pressure regulator 44 to a line 46 that leads to a valve 48 that is operated by a solenoid 50. In its illustrated position the valve interrupts the hydraulic connection between line 46 and the supply passage system 52 for the two hydraulic cylinders 30. The cylinders are depressurized through a vent passage 54, the valve, and drain line 56.

Solenoid 50 is energized by a relay 58 that receives an input signal from a potentiometer 60 located in surrounding relation to the column 62 of a steering wheel (or controller) 64. As the driver of the vehicle manually rotates steering controller 64 to produce a vehicle turn action a slider 66 on column 62 traverses the potentiometer 60 to thereby energize relay 58; the relay output energizes solenoid 50 which operates valve 48 to the condition wherein line 46 communicates with passage system 52, thus pressurizing the two hydraulic cylinders 30.

The pressurized cylinders apply increased forces on the roadarms for the two centermost roadwheels 18. The increased suspension force in the center area of the vehicle increases the track-ground pressure in that area and simultaneously reduces the track-ground pressure at the four other roadwheels. The result is an easier pivot turn.

The reduction in track-ground pressure at the endmost roadwheels is related to the pressurization of cylinders 30, which in turn is proportional to the liquid pressure in line 46. In the system of FIG. 1 the line 46 pressure can be increased or decreased by the pressure regulator 44. As shown schematically in the drawing, regulator 44 comprises a valve element 67 carried by a piston 68 that is urged in the pressure-increase direction by a spring 70. A stepping motor 72 is arranged to rotate a spring seat screw 74, to thus increase or decrease the spring force and hence the pressure setting of the regulator valve. Energization or de-energization of motor 72 is controlled by the strength of the analog signal generated by potentiometer 60; an amplifier 76 is interposed between the potentiometer and motor.

The system is designed so that regulator 44 continually produces a pressurized condition in line 46 irrespective of the condition of valve 48. As the driver begins to exert a turning force on wheel 64 the amplified potentiometer signal energizes motor 72 to thereby further increase the line 46 pressure. The increase in line 46 pressure is designed to be generally directly proportional to the rotation of steering wheel 64. Thus, when the driver moves wheel 64 through a large distance the regulator 44 will provide a relatively large increase in the line 46 pressure, hence a large pressurization of cylinders 30 and a corresponding decrease in the track-ground pressure at the endmost roadwheels 18. When the driver turns wheel 64 through a lesser distance (to produce a more gradual vehicle turn) the pressurization of cylinders 30 is not as great. However in each instance when wheel 64 is turned valve 48 is opened to produce a significant pressurization of cylinders 30. When wheel 64 is returned to its original straight-ahead position slider 66 terminates the potentiometer signal, thereby de-energizing solenoid 50 and returning valve 48 to the illustrated condition for depressurizing cylinders 30. During straight-ahead movement of the vehicle cylinders 30 have no effect on the suspension system.

The system of FIG. 1 represents a preferred embodiment of the invention because the hydraulic accumulator 40 maintains the system at a high standby pressure for instant pressurization of cylinders 30 when the steering wheel is manually actuated. However, the invention can be practiced in other forms. FIG. 3 illustrates an arrangement wherein the suspension force on the centermost roadwheel is temporarily increased by increasing the pre-twist force applied to the torsion bar for the centermost roadarm. As shown in FIG. 3 the anchorage for the torsion bar 24 takes the form of a sector gear 78 meshed with a pinion gear 80 adapted to be driven by a non-illustrated torque motor. The torque motor would be energized by an amplified signal generated at the potentiometer (not shown in FIG. 3). Energization of the motor to produce counterclockwise rotation of gear 80 produces clockwise motion of gear 78 and corresponding increase in the pre-twist force applied to torsion bar 24. Removal of the potentiometer signal returns the torque motor and associated gears to their normal positions.

I wish it to be understood that I do not desire to be limited to the exact details of construction shown and described for obvious modifications will occur to a person skilled in the art.

I claim:

1. In a tracked vehicle having two sets of roadwheels located alongside the vehicle hull; a ground-engaged track trained beneath each set of roadwheels; propulsion means for delivering mechanical power to each track; and a manual steering controller for selectively reducing or increasing the power to each track, to thereby cause the vehicle to turn in the direction of the track that receives the reduced power; each roadwheel being carried on a roadarm that is swingably attached to the hull; each roadarm having resilient force means associated therewith for applying a hull-suspension force to the respective roadwheel: the improvement comprising means responsive to manual operation of the steering controller for temporarily increasing the suspension force that is applied to at least one of the centermost roadwheels in each set of wheels while the vehicle is undergoing a turning maneuver, whereby the other roadwheels are caused to bear lesser hull-suspension forces than would be the case during straight-ahead movement of the vehicle; said force-increasing means comprising a hydraulic cylinder means (30) attached between the hull and one of the centermost roadwheels in each set of wheels, a source of pressurized hydraulic fluid, a valve (50) operable in response to controller movement for communicating the pressurized source with each hydraulic cylinder means, a pressure-regulating valve means (44) interposed between the source of pressurized fluid and the hydraulic cylinder means, and means (72) responsive to movement of the steering controller for adjusting the pressure setting of the regulating valve means inversely in accordance with the vehicle turning radius.

2. The improvement of claim 1: said source of pressurized fluid including a hydraulic accumulator (40), a motor-operated pump (32, 34), and a pressure switch 36 responsive to accumulator pressure for controlling the motor to maintain a desired accumulator pressure.

* * * * *